United States Patent
Alford, Jr. et al.

(10) Patent No.: US 7,253,222 B2
(45) Date of Patent: *Aug. 7, 2007

(54) ANTISKINNING COMPOUND AND COMPOSITIONS CONTAINING THEM

(75) Inventors: Daniel Alford, Jr., Pottstown, PA (US); Paul David Fellenger, Narvon, PA (US); Jianfeng Lou, Wayne, PA (US); Nicholas Michael Martyak, Doylestown, PA (US)

(73) Assignee: Arkema Inc., Philadelphia, PA (US)

( * ) Notice: Subject to any disclaimer, the term of this patent is extended or adjusted under 35 U.S.C. 154(b) by 21 days.

This patent is subject to a terminal disclaimer.

(21) Appl. No.: 10/859,304

(22) Filed: Jun. 2, 2004

(65) Prior Publication Data

US 2005/0272841 A1    Dec. 8, 2005

(51) Int. Cl.
*C08K 5/05* (2006.01)
*C08K 5/32* (2006.01)
*C09D 147/00* (2006.01)

(52) U.S. Cl. .................... 524/236; 524/247; 524/251; 106/31.97

(58) Field of Classification Search ............... 524/236, 524/247, 251; 106/31.97
See application file for complete search history.

(56) References Cited

U.S. PATENT DOCUMENTS 4,482,662 A * 11/1984 Rapaport et al. ............ 523/504
2003/0025105 A1 * 2/2003 Steinert et al. ............. 252/403

FOREIGN PATENT DOCUMENTS

DE    1519103    * 12/1969

* cited by examiner

*Primary Examiner*—Kriellion A Sanders
(74) *Attorney, Agent, or Firm*—Steven D. Boyd

(57) ABSTRACT

The invention relates to anti-skinning agents containing mixtures of organic compounds (combinations of additives), whereby the organic compounds are selected from the groups of (a) organic hydroxylamines and (b) alkylamines and/or alkyl alkanolamines and also relates to compositions containing the combination, especially oxidatively drying paints or coating compositions and article coated with such oxidatively drying paints or coating compositions.

18 Claims, No Drawings

ANTISKINNING COMPOUND AND COMPOSITIONS CONTAINING THEM

FIELD OF THE INVENTION

The invention relates to anti-skinning agents containing mixtures of organic compounds (combinations of additives), coating compositions containing them and articles coated with them. The organic compounds are selected from the groups of (a) organic hydroxylamines and (b) amines including alkyl amines and/or alkyl alkanolamines. The invention further relates to compositions containing these anti-skinning agents, like coating compositions such as oxidatively drying alkyd resins.

BACKGROUND OF THE INVENTION

Colorless and pigmented oxidatively drying paints and coatings based on oxidatively drying oils, alkyd resins, epoxy esters and other oxidatively drying refined oils are known. These oils and binders crosslink oxidatively under the influence of oxygen (preferably atmospheric oxygen) by means of the addition of driers, such as metal carboxylates of transition metals. If this crosslinking takes place before the product is actually used, they can form a solid barrier film, a skin, on the surface when stored in open or closed containers. This is highly undesirable and should therefore be avoided since it makes the paint more difficult to work with and commonly interferes with the uniform distribution of the driers. The accumulation of the driers in the paint skin that forms can lead to considerable delays in the drying of the paint when it is applied.

Skinning in the paint film after application is also disadvantageous. Excessively rapid drying of the surface of the paint prevents the lower film layers from drying evenly because they are shielded from oxygen, which is prevented from sufficiently penetrating into and dispersing within the paint film. This can lead among other things to flow problems in the paint film, adhesion problems, or insufficiently hard films.

It is known to add organic substances to the paint that inhibit the reaction of the drier metal with (atmospheric) oxygen by binding the oxygen or by complexing of the drier metal.

U.S. Pat. No. 4,618,371 describes the use of aliphatic α-hydroxy ketones as anti-skinning agents. DF-A 1 519 103 discloses N,N-dialkylated hydroxylamines for this purpose. Because of their low volatility, however, hydroxylamines alone can lead to severe delays in drying and often also to reduced film hardness values, so that their possible applications are limited. They have not been able to gain acceptance as anti-skinning agents. U.S. patent application publication No. 2003/0025105 describes the use of organic hydroxylamines such as diethylhydroxylamine and β-dicarbonyl compounds such as diethylformamide as anti-skinning agents.

Oximes or suitable phenolic compounds are mostly used today as anti-skinning agents in industry. The phenolic anti-skinning agents display a significant delay in surface drying, however, such that alone they are only suitable for certain coating compositions. Oximes such as e.g. methyl ethyl ketoxime (MEKO) or butyraldoxime, on the other hand, display only slight delays in surface drying due to their volatility. The most significant disadvantage of the oximes, which are widely used today, lies in their toxicity. As a consequence of this, users have to observe elaborate personal protection precautions when working with paints containing oximes as anti-skinning agents.

It was discovered that the use of mixtures containing the organic compounds described below provide inhibition of skinning with minimal impact on drying properties. In particular, the above-mentioned disadvantages of the specified hydroxylamines as anti-skinning agents could also be avoided by combining such substances with the additional compounds described below, and hence products that better satisfy requirements as anti-skinning agents are obtained.

In air-drying alkyd resin the mixtures according to the invention are suitable for preventing undesirable skinning and for improving the complete drying of resin films after application.

SUMMARY OF THE INVENTION

The invention relates to an anti-skinning agent containing
a) an organic hydroxylamine compound of formula (I)

where $R^1$ and $R^2$ mutually independently hydrogen, a linear or branched, saturated or unsaturated $C_1$-$C_{20}$ aliphatic radical, which can optionally be mono- or polysubstituted, or a $C_6$-$C_{12}$ aryl radical, a $C_7$-$C_{14}$ araliphatic radical or a $C_5$-$C_7$ cycloaliphatic radical,
and either or both of
b) an organic alkyl amine compound of formula (II)

where $R^3$, $R^4$ and $R^5$ may be mutually independently hydrogen but all three can not be hydrogen, a linear or branched, saturated or unsaturated $C_1$-$C_{20}$ aliphatic radical, which can optionally he mono- or polysubstituted, or a $C_6$-$C_{12}$ aryl radical, a $C_7$-$C_{14}$ araliphatic radical or a $C_5$-$C_7$ cycloaliphatic radical.
c) an organic alkyl alkanolamine compound of formula (III)

where $R^6$ and $R^8$ may be mutually independently hydrogen but both can not be hydrogen, a linear or branched, saturated or unsaturated $C_1$-$C_{20}$ aliphatic radical, which can optionally be mono- or polysubstituted, a $C_6$-$C_{12}$ aryl radical, a $C_7$-$C_{14}$ araliphatic radical or a $C_5$-$C_7$ cycloaliphatic radical and $R^8$ may be a linear or branched, saturated or unsaturated $C_1$-$C_{20}$ aliphatic radical, which can optionally be mono- or polysubstituted, a $C_6$-$C_{12}$ aryl radical, a $C_7$-$C_{14}$ araliphatic radical or a $C_5$-$C_7$ cycloaliphatic radical.

Representative hydroxylamines include but not limited to: diethylhydroxylamine, dibutylhydroxylamine and dibenzylhydroxylamine.

Representative alkyl amines include but not limited to: monoethyl amine, diethyl amine, triethyl amine, monoisopropyl amine, diisopropyl amine, monobutyl amine, dibutylamine, tributyl amine, monoamyl amine, dimethyl ethyl amine, dimethyl isopropyl amine, ethyl diisopropyl amine, sec-butyl amine, tetramethylpropylenediamine, diethylaminopropylamine, 3-methoxypropylamine, dimethylaminopropylaminopropylamine and 3-isopropoxypropylamine.

Representative alkyl alkanolamines include but not limited to: methylaminoethanol, dimethylaminoethanol, methyldiethanolamine, ethylaminoethanol, diethylaminoethanol, dimethylamino-2-propanol, isopropylaminoethanol, disiopropylaminoethanol, butylaminoethanol, dibutylaminoethanol, butyldiethanolamine, tert-butylaminoethanol.

The invention also relates to compositions of matter containing these anti-skinning agents.

DETAILED DESCRIPTION OF THE INVENTION

For the purposes of the invention mixtures of organic compounds of formulae (I) and (II) and/or (III) are used alone or as solutions or dispersions or emulsions in water and/or organic solvents. Suitable organic solvents include all conventional solvents, such as aromatics, white spirits, ketones, alcohols, ethers and fatty acid esters.

For the use according to the invention the organic compounds of formulae (I) and (II) and/or (III) can be used in a broad range of mixtures with one another. They are preferably used in the ratio (I):(II) or (III)=0:10 to 10:0.1 parts. In a mixture consisting of all three components each or the components can mutually independently preferably be used in the ratio 0.1 to 10 to each of the other components used. They can be used in pure form or in aqueous solution or aqueous dispersion or emulsion or in the form of solutions in organic solvents, whereby aqueous in this context is intended to mean that water is either the sole solvent or is added in a quantity of over 50 wt. % relative to the solvent blend together with conventional organic solvents (e.g. alcohols).

The amount of anti-skinning agents primarily depends on the content of binder and drier used in the particular coating composition. As a general rule between 0.001 and 2.0 wt. % of mixtures of compounds according to formulae (I) and (II) and/or (III) should be added. Preferred amounts to be used are 0.01 to 0.5 wt. %, relative in each case to the overall recipe of the coating composition. The amounts can also depend on the type of binder and the pigments used. Thus in special systems the relative amount of additive to be used can also be greater than 2.0 wt. % (relative to the overall recipe).

It is an advantage of the anti-skinning agent of the present invention that it reliably prevents skinning in a wide range of binders and when used with various driers but does not unfavorably influence other drying properties of the resin.

The invention is further illustrated but is not intended to be limited by the following examples in which all parts and percentages are by weight unless otherwise specified.

EXAMPLES

Example 1

This example shows the performance of a hydroxylamine, diethylhydroxylamine (DEHA)-amine formulations containing no additional volatile organic compounds such as diethyl formamide (DEF) in a short oil alkyd resin. A common short oil resin, Beckosol 12054 (available from Reichhold Chemicals, Inc.), containing 50% solids was used to compare MEKO to combinations of DEHA and alkyl amines or alklyl alkanolamines. Cobalt octoate was added to the resin so the final cobalt ion concentration was 0.2%. To the resin-cobalt mixture was added MEKO (available as a 25% active solution), DEHA with diethyl formamide (DEF) as a 14% active solution or DEHA with either alkyl amines or alkyl alkanolamines. The samples were prepared on an eqi-molar basis using 750 ppm of DEHA (e.g., 750 mg/l; 0.0084 mol DEHA/l). Ten-gram samples were placed in bottles and a small hole was drilled into the cap so air could enter into the bottles. Air was swept over the top of the bottles using a flow rate of about 100 feet per minute The onset of skinning was monitored daily with the following results:

| MEKO (0.055 mmol active) | MEKO (0.114 mmol active) | Diethylhydroxylamine (0.065 mmol) + Diethyl formamide (0.016 mmol) | Diethylhydroxylamine (0.068 mmol) + Diisoprolyaminoethanol (0.018 mmol) | Diethylhydroxylamine (0.069 mmol) + Ethylaminoethanol (0.018 mmol) | Diethylhydroxylamine (0.066 mmol) + Dibutyl amine (0.016 mmol) |
|---|---|---|---|---|---|
| 13 Days | 20 Days | 62 Days | >70 Days | >70 Days | >70 Days |

The MEKO samples showed poor resistance to skinning even at 0.114 mmol concentration. The sample containing diethylhydroxylamine with the co-solvent diethyl formamide showed better skinning performance than MEKO. The samples containing diethylhydroxylamine with either an alkyl amine or alklyl alkanolamine showed the overall best anti-skinning performance. The surfaces of the last three samples were only tacky and not completely skinning even after 70 days of exposure to air.

Similar skinning results were found with other combination of diethylhydroxylamine and other alkyl amines such as diisopropyl amine (DiPA), tributyl amine (TBA) and triethyl amine (TEA), all samples were tacky and not completely skinned after 70 days. Similarly, combinations of diethylhydroxylamine with other alkyl alkanolamines such as dibutylaminoethanol (DBAE) also delayed skinning to greater than 70 days. In all cases, the total concentration of DEHA with either the alkyl amino or the alkyl alkanolamines was about 0.081 mmol in the ten-gram sample or about 8 mmol/kg of resin.

Example 2

This example shows the dry-through performance of the short-oil resin used in Example 1 with eqimolar amounts of prior art antiskinning agents, and those of the present invention based on 750 ppm DEHA (0.084 mmol DEHA/10 gram of resin). However, the cobalt concentration for this dry-through performance study was decreased to 0.1%. The resin with the cobalt drier and the antiskinning agents were placed onto substrate and a drawdown bar was used to apply a three mil thick coating. The samples were placed in an exhaust hood with air flowing over the samples at about 100 feet per minute. The tack-free time was determined by the absence of a fingerprint on the resin.

The dry-through performance was monitored using a methyl ethyl ketone (MEK) double-rub. Cheesecloth was soaked in MEK for about ten seconds then applied to the resin using a downward force of one pound per square in (1 psi). One complete rub was counted as a forward and backward stroke. The number of double-rubs necessary to remove the resin is an indication of the dry-through: the higher the number of MEK double rubs (DR), the faster the dry-through.

| Drying Time | DEHA Only (0.086 mmol) | DEHA (0.068 mmol) + DBAE (0.017 mmol) | DEHA (0.068 mmol) + EAE (0.017 mmol) | DEHA (0.068 mmol) + DiPAE (0.017 mmol) | MEKO (0.337 mmol) (0.337 mmol × 25% = 0.084 mmol active MEKO) | Borcher 0241 (0.588 mmol) (0.588 mmol × 14% = 0.082 mmol active material) |
|---|---|---|---|---|---|---|
| | 1 | 3 | 4 | 5 | 7 | 8 |
| | Tack Free Time <3 mins | Tack Free Time <3 mins | Tack Free Time <3 mins | Tack Free Time <3 mins | Tack Free Time <3 mins | Tack Free Time <3 mins |
| 3 Hours | MEK DRs <3 | MEK DRs <3 | MEK DRs <3 | MEK DRs <3 | MEK DRs <3 | MEK DRs <3 |
| 27 Hours | MEK DRs 2 | MEK DRs 2 | MEK DRs 2 | MEK DRs 2 | MEK DRs 10 | MEK DRs 2 |
| 124 Hours | MEK DRs 6 | MEK DRs 6 | MEK DRs 6 | MEK DRs 6 | MEK DRs 10 | MEK DRs 7 |
| 264 Hours | MEK DRs 20 | MEK DRs 30 | MEK DRs 30 | MEK DRs 35 | MEK DRs 30 | MEK DRs 30 |
| 480 Hours | MEK DRs 25 | MEK DRs 25 | MEK DRs 25 | MEK DRs 30 | MEK DRs 30 | MEK DRs 30 |

The resin containing the MEKO anti-skinning agent showed the fastest dry-through rate due to the high volatility of MEKO but yielded the poorest anti-skinning performance as seen in Example 1. The samples containing DEHA with an alkyl alkanolamine showed similar dry-through properties to the sample containing DEHA with DEF.

Example 2 shows that the combination of diethylhydroxylamine with an alkyl alkanolamine showed increased resistance to skinning, without compromising dry-through performance in comparison to the prior art MEKO and DEHA with DEF.

EXAMPLE 3

This example shows the dry-through performance of the short-oil resin used in Example 1 with eqimolar amounts of antiskinning agents using alkyl amines, based on 750 ppm DEHA (0.084 mmol DEHA/10 gram of resin). The same procedure used in example 2 was used in Example 3.

| Drying Time | MEKO (0.337 mmol) (0.337 mmol × 25% = 0.084 mmol active MEKO) | Borcher 0241 (0.588 mmol) (0.588 mmol × 14% 0.082 mmol active material) | DEHA (0.068 mmol) + DiPA (0.017 mmol) | DEHA (0.068 mmol) + DBA (0.017 mmol) | DEHA (0.068 mmol) + TBA (0.017 mmol) | DEHA (0.069 mmol) + TBA (0.017 mmol) |
|---|---|---|---|---|---|---|
| | Tack Free Time <3 mins | Tack Free Time <3 mins | Tack Free Time <3 mins | Tack Free Time <3 mins | Tack Free Time <3 mins | Tack Free Time <3 mins |
| 3 Hours | MEK DRs <3 | MEK DRs <3 | MEK DRs <3 | MEK DRs <3 | MEK DRs <3 | MEK DRs <3 |
| 27 Hours | MEK DRs 10 | MEK DRs 2 | MEK DRs 2 | MEK DRs 2 | MEK DRs 2 | MEK DRs 2 |
| 124 Hours | MEK DRs 10 | MEK DRs 7 | MEK DRs 8 | MEK DRs 10 | MEK DRs 11 | MEK DRs 10 |
| 264 Hours | MEK DRs 30 | MEK DRs 30 | MEK DRs 25 | MEK DRs 30 | MEK DRs 25 | MEK DRs 30 |
| 480 Hours | MEK DRs 30 | MEK DRs 30 | MEK DRs 25 | MEK DRs 30 | MEK DRs 30 | MEK DRs 30 |

The resin containing the MEKO anti-skinning agent showed the fastest dry-through rate due to the high volatility of MEKO but yielded the poorest anti-skinning performance as seen in Example 1. The samples containing DEHA with an alkyl amine showed better dry-through performance after 124 hours than the sample containing DEHA with DEF. The samples containing DEHA with an alkyl amine showed similar results after 264 and 480 hours to the Borcher 0241 (containing DEHA with DEF available form Borcher GmbH Ltd.) but enhanced anti-skinning performance as seen in Example 1.

Example 3 shows that the combination of diethylhydroxylamine with an alkyl amine showed increased resistance to skinning, without compromising dry-through performance in comparison to the prior art MEKO and DEHA with DEF.

Example 4

This example shows the performance of DEHA-alkyl alkanolamine formulations containing no additional volatile organic compounds such as DEF in a medium oil resin. A common medium oil resin, Beckosol 11081 (available form Reichhold Chemicals, Inc.) containing 50% solids was used to compare MEKO to combinations of DEHA and alkyl alkanolamines. Cobalt octoate was added to the resin so the final cobalt ion concentration was 0.2%. To the resin-cobalt mixture was added MEKO, or DEHA with an alkyl alkanolamine. Ten-gram samples were prepared on an eqimolar basis using 750 ppm (e.g., 750 mg/l; 0.0084 mol DEHA/l) of diethylhydroxylamine hydroxide (DEHA).

| MEKO (0.055 mmol active) | MEKO (0.114 mmol active) | Diethylhydroxylamine (0.065 mmol) + Diethyl formamide (0.016 mmol) | Diethylhydroxylamine (0.068 mmol) + Diisoproplyaminoethanol (0.018 mmol) | Diethylhydroxylamine (0.069 mmol) + Ethylaminoethanol (0.018 mmol) |
|---|---|---|---|---|
| 2 Days | 7 Days | 32 Days | 37 Days | 37 Days |

The MEKO samples showed poor resistance to skinning even at 0.114 mmol. The sample containing diethylhydroxylamine with diethyl formamide showed better skinning performance than the MEKO samples. The samples containing diethylhydroxylamine with alkyl alkanolamines, DiPAE or EAE showed the best overall skinning performance. The skinning performance of the samples containing DEHA with an alkyl alkanolamine performed better than that containing DEHA with DEF yet no additional co-solvents were necessary in the DEHA-alkyl alkanolamine samples.

Example 5

This example shows the dry-through performance of the medium oil resin used in Example 4 with eqimolar amounts of antiskinning agents, based on 750 ppm DEHA (~0.085 mmol DEHA/10 grain of resin). However, the cobalt concentration for the dry-through performance study was decreased to 0.1%. The resin with the cobalt drier and the antiskinning agents were placed onto substrate and a draw-down bar was used to apply a three mil thick coating. The samples were placed in an exhaust hood with air flowing over the samples at about 100 feet per minute. The track-free time was determined by the absence of a fingerprint on the resin.

| Drying Time Tack-Free | MEKO (0.4487 mmol) (0.4487 mmol × 25% = 0.112 mmol active MEKO) Tack Free Time > 2 Hours | Rorcher 0241 (0.588 mmol) (0.7545 mmol × 14% = 0.110 mmol active material) Tack Free Time > 2 Hours | DEHA (0.090 mmol) Tack Free Time > 2 Hours | DEHA (0.068 mmol) + DiPAE (0.017 mmol) Tack Free Time > 2 Hours | DEHA (0.068 mmol) + TBA (0.017 mmol) Tack Free Time > 2 Hours |
|---|---|---|---|---|---|
| 3.5 Hours | MEK DRs 11 | MEK DRs 8 | MEK DRs 7 | MEK DRs 8 | MEK DRs 7 |
| 30 Hours | MEK DRs 14 | MEK DRs 11 | MEK DRs 8 | MEK DRs 9 | MEK DRs 9 |
| 146 Hours | MEK DRs 14 | MEK DRs 12 | MEK DRs 12 | MEK DRs 12 | MEK DRs 12 |

The resin containing the MEKO anti-skinning agent showed the fastest dry-through rate due to the high volatility of MEKO but yielded the poorest anti-skinning performance as seen in Example 1. After about 30 hours, the samples containing DEHA with either an alkyl amine (TBA) or an alkyl alkanolamine (DiPAE) showed similar dry-through performance to the DEHA sample containing the DEF but no additional VOC are present as with the use of DEF.

Example 6

This example shows the dry-through performance of the medium oil resin used in Example 4 with eqimolar amounts of antiskinning agents, based on 750 ppm. DEHA (~0.085 mmol DEHA/10 gram of resin). However, the DEHA concentration was lowered to 0.0515 mmol and the amine concentration was increased to 0.0340 mmol. The cobalt concentration for the dry-through performance study was 0.1%. The resin with the cobalt dricr and the antiskinning agents were placed onto a substrate and a drawdown bar was used to apply a three mil thick coating. The samples were placed in an exhaust hood with air flowing over the samples at about 100 feet per minute. The tack-free time was determined by the absence of a fingerprint on the resin.

| Drying Time Tack-Free | MEKO (0.4487 mmol) (0.4487 mmol × 25% = 0.112 mmol active MEKO) Tack Free Time > 2 Hours | Borcher 0241 (0.588 mmol) (0.7845 mmol × 14% = 0.110 mmol active material) Tack Free Time > 2 Hours | DEHA (0.090 mmol) Tack Free Time > 2 Hours | DEHA (0.0515 mmol) + DiPAE (0.0342 mmol) Tack Free Time > 2 Hours | DEHA (0.0515 mmol) + TBA (0.0342 mmol) Tack Free Time > 2 Hours |
|---|---|---|---|---|---|
| 3.5 Hours | MEK DRs 11 | MEK DRs 8 | MEK DRs 7 | MEK DRs 8 | MEK DRs 10 |
| 30 Hours | MEK DRs 14 | MEK DRs 11 | MEK DRs 8 | MEK DRs 10 | MEK DRs 11 |
| 146 Hours | MEK DRs 14 | MEK DRs 12 | MEK DRs 12 | MEK DRs 14 | MEK DRs 13 |

The resin containing the MEKO anti-skinning agent showed the fastest dry-through rate due to the high volatility of MEKO but yielded the poorest anti-skinning performance as seen in Example 1. After about 30 hours, the samples containing DEHA with either an alkyl amine (TBA) or an alkyl alkanolamine (DiPAE) showed similar dry-through performance to the DEHA sample containing the DEF but no additional VOC are present as with the use of DEF.

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A coating material, paint or finish which contains an alkyd resin oxidatively drying film former and, as an anti-skinning agent, a combination of
   a) diethylhydroxylamine; and an amine selected from the group consisting of b) an alkyl amine of formula (II)

where $R^3$, $R^4$ and $R^5$ may be mutually independently hydrogen but all three can not be hydrogen, a linear or branched, saturated or unsaturated, unsubstituted or mono- or polysubstituted, $C_1$-$C_{20}$ aliphatic radical, or a $C_6$-$C_{12}$ aryl radical, a $C_7$-$C_{14}$ araliphatic radical or a $C_5$-$C_7$ cycloaliphatic radical, at least one of $R^3$, $R^4$ or $R^5$ is an alkyl radical, c) an alkyl alkanol amine of formula (III)

where $R^6$ and $R^8$ may be mutually independently hydrogen but both can not be hydrogen, a linear or branched, saturated or unsaturated, unsubstituted or mono- or polysubstituted, $C_1$-$C_{20}$ aliphatic radical, a $C_6$-$C_{12}$ aryl radical, a $C_7$-$C_{14}$ araliphatic radical or a $C_5$-$C_7$ cycloaliphatic radical and $R^8$ may be a linear or branched, saturated or unsaturated $C_1$-$C_{20}$ aliphatic radical, which can optionally be mono- or polysubstituted, a $C_6$-$C_{12}$ aryl radical, a $C_7$-$C_{14}$ araliphatic radical or a $C_5$-$C_7$ cycloaliphatic radical, at least one of $R^6$ or $R^8$ is an alkyl radical and d) mixtures thereof.

2. The coating material, paint or finish of claim 1 wherein the alkyl amine is selected from: monoethyl amine, diethyl amine, triethyl amine, monoisopropyl amine, diisopropyl amine, monobutyl amine, dibutylamine, tributyl amine, monoamyl amine, dimethyl ethyl amine, dimethyl isopropyl amine, ethyl diisopropyl amine, sec-butyl amine, tetramethylpropylenediamine, diethylaminopropylamine, 3-methoxypropylamine, dimethylaminopropylaminopropylamine and 3-isopropoxypropylamine or mixtures thereof.

3. The coating material, paint or finish of claim 1 wherein the alkyl alkanolamine is selected from: methylaminoethanol, dimethylaminoethanol, methydiethanolamine, ethylaminoethanol, diethylaminoethanol, dimethylamino-2-propanol, isopropylaminoethanol, disiopropylaminoethanol, butylaminoethanol, dibutylaminoethanol, butyldiethanolamine, tert-butylaminoethanol or mixtures thereof.

4. The coating material, paint or finish of claim 1, which contains the said combination in an amount of from 0.001 to 2% by weight, based on the total surface coating.

5. The coating material, paint or finish of claim 1, which contains said combination together with other antiskinning agents and antioxidants.

6. A process for the production of a coating material, paint or finish containing an alkyd resin oxidatively drying film former, wherein an antiskinning combination comprising
a) diethylhydroxylamine; and an amine selected from the group consisting of
b) an alkyl amine of formula (II)

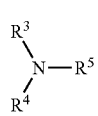

where $R^3$, $R^4$ and $R^5$ may be mutually independently hydrogen but all three can not be hydrogen, a linear or branched, saturated or unsaturated, unsubstituted or mono- or polysubstituted, $C_1$-$C_{20}$ aliphatic radical, or a $C_6$-$C_{12}$ aryl radical, a $C_7$-$C_{14}$ araliphatic radical or a $C_5$-$C_7$ cycloaliphatic radical, at least one of $R^3$, $R^4$ or $R^5$ is an alkyl radical,
c) an alkyl alkanolamine of formula (III)

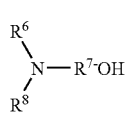

where $R^6$ and $R^8$ may be mutually independently hydrogen but both can not be hydrogen, a linear or branched, saturated or unsaturated $C_1$-$C_{20}$ aliphatic radical, which can optionally be mono- or polysubstituted, a $C_6$-$C_{12}$ aryl radical, a $C_7$-$C_{14}$ araliphatic radical or a $C_5$-$C_7$ cycloaliphatic radical and $R^8$ may be a linear or branched, saturated or unsaturated, unsubstituted or mono- or polysubstituted, $C_1$-$C_{20}$ aliphatic radical, a $C_6$-$C_{12}$ aryl radical, a $C_7$-$C_{14}$ araliphatic radical or a $C_5$-$C_7$ cycloaliphatic radical, at least one of $R^6$ or $R^8$ is an alkyl radical and d) mixtures thereof is incorporated into the coating material, paint or finish.

7. The process of claim 6 wherein the alkyl amine is selected from: monoethyl amine, diethyl amine, triethyl amine, monoisopropyl amine, diisopropyl amine, monobutyl amine, dibutylamine, tributyl amine, monoamyl amine, dimethyl ethyl amine, dimethyl isopropyl amine, ethyl diisopropyl amine, sec-butyl amine, tetramethylpropylenediamine, diethylaminopropylamine, 3-methoxypropylamine, dimethylaminopropylaminopropylamine and 3-isopropoxypropylamine or mixtures thereof.

8. The process of claim 6 wherein the alkyl alkanolamine is selected from: methylaminoethanol, dimethylaminoethanol, methydiethanolamine, ethylaminoethanol, diethylaminoethanol, dimethylamino-2-propanol, isopropylaminoethanol, disiopropylaminoethanol, butylaminoethanol, dibutylaminoethanol, butyldiethanolamine, tert-butylaminoethanol or mixtures thereof.

9. The process of claim 6, wherein said coating material, paint or finish containing an oxidatively drying film former contains said combination in an amount of from 0.001 to 2% by weight, based on the total surface coating.

10. The process of claim 6, wherein said coating material, paint or finish contains said combination together with other antiskinning agents and antioxidants.

11. An article coated with a coating material, paint or finish containing an alkyd resin oxidatively drying film former, wherein an antiskinning combination comprising
a) diethylhydroxylamine; and an amine selected from the group consisting of
b) an alkyl amine of formula (II)

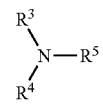

where $R^3$, $R^4$ and $R^5$ may be mutually independently hydrogen but all three can not be hydrogen, a linear or branched, saturated or unsaturated, unsubstituted or mono- or polysubstituted, $C_1$-$C_{20}$ aliphatic radical, or a $C_6$-$C_{12}$ aryl radical, a $C_7$-$C_{14}$ araliphatic radical or a $C_5$-$C_7$ cycloaliphatic radical, at least one of $R^3$, $R^4$ or $R^5$ is an alkyl radical,
c) an alkyl alkanolamine of formula (III)

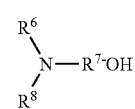

where $R^6$ and $R^8$ may be mutually independently hydrogen but both can not be hydrogen, a linear or branched, saturated or unsaturated, unsubstituted or mono- or polysubstituted, $C_1$-$C_{20}$ aliphatic radical, a $C_6$-$C_{12}$ aryl radical, a $C_7$-$C_{14}$ araliphatic radical or a $C_5$-$C_7$ cycloaliphatic radical and $R^8$ may be a linear or branched, saturated or unsaturated $C_1$-$C_{20}$ aliphatic radical, which can optionally be mono- or polysubstituted, a $C_6$-$C_{12}$ aryl radical, a $C_7$-$C_{14}$ araliphatic radical or a $C_5$-$C_7$ cycloaliphatic radical, at least one of $R^6$ or $R^8$ is an alkyl radical and d) mixtures thereof is incorporated into the coating material, paint or finish.

12. The article of claim 11 wherein the alkyl amine is selected from: monoethyl amine, diethyl amine, triethyl amine, monoisopropyl amine, diisopropyl amine, monobutyl amine, dibutylamine, tributyl amine, monoamyl amine, dimethyl ethyl amine, dimethyl isopropyl amine, ethyl diisopropyl amine, sec-butyl amine, tetramethylpropylenediamine, diethylaminopropylamine, 3-methoxypropylamine, dimethylaminopropylaminopropylamine and 3-isopropoxypropylamine or mixtures thereof.

13. The article of claim 11 wherein the alkyl alkanolamine is selected from: methylaminoethanol, dimethylaminoethanol, methydiethanolamine, ethylaminoethanol, diethylaminoethanol, dimethylamino-2-propanol, isopropylaminoethanol, disiopropylaminoethanol, butylaminoethanol, dibutylaminoethanol, butyldiethanolamine, tert-butylaminoethanol or mixtures thereof.

14. The article of claim 11, wherein said coating material, paint or finish containing an oxidatively drying film former contains said combination in an amount of from 0.001 to 2% by weight, based on the total surface coating.

15. The article of claim 11, wherein said wherein said coating material, paint or finish contains said combination together with other antiskinning agents and antioxidants.

16. The coating material, paint or finish of claim 1, wherein said alkyd resin is selected from short oil alkyd resins or medium oil alkyd resins.

17. The process for the production of a coating material, paint or finish of claim 6, wherein said alkyd resin is selected from short oil alkyd resins or medium oil alkyd resins.

18. The article coated with a coating material, paint or finish of claim 11, wherein said alkyd resin is selected from short oil alkyd resins or medium oil alkyd resins.

* * * * *